US012596683B2

(12) United States Patent
Duval

(10) Patent No.: US 12,596,683 B2
(45) Date of Patent: Apr. 7, 2026

(54) LOG-STRUCTURED FILE SYSTEM FOR A ZONED BLOCK MEMORY DEVICE

(71) Applicant: Micron Technology, Inc., Boise, ID (US)

(72) Inventor: Olivier Duval, Pacifica, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/819,789

(22) Filed: Aug. 29, 2024

(65) Prior Publication Data
US 2024/0419636 A1    Dec. 19, 2024

Related U.S. Application Data

(62) Division of application No. 17/005,671, filed on Aug. 28, 2020, now Pat. No. 12,105,675.

(51) Int. Cl.
*G06F 16/00*        (2019.01)
*G06F 11/14*        (2006.01)
        (Continued)

(52) U.S. Cl.
CPC ...... *G06F 16/1734* (2019.01); *G06F 11/1407* (2013.01); *G06F 11/1435* (2013.01);
        (Continued)

(58) Field of Classification Search
CPC ..... G06F 1/00; G06F 3/00; G06F 5/00; G06F 7/00; G06F 8/00; G06F 9/00; G06F 11/00; G06F 12/00; G06F 13/00; G06F 15/00; G06F 16/00; G06F 17/00; G06F 18/00; G06F 21/00; G06F 30/00; G06F 40/00; G06F 16/128; G06F 16/23; G06F 16/27;
        (Continued)

(56) References Cited

U.S. PATENT DOCUMENTS 5,187,780 A      2/1993  Clark et al.
9,153,290 B1    10/2015  Bandic et al.
        (Continued)

OTHER PUBLICATIONS

U.S. Appl. No. 17/005,671, Restriction Requirement mailed Jul. 15, 2022, 6 pgs.
        (Continued)

*Primary Examiner* — Shyue Jiunn Hwa
(74) *Attorney, Agent, or Firm* — Schwegman Lundberg & Woessner, P.A.

(57)        ABSTRACT

A processing device writes file system data to a first area of a memory zone of a zoned block memory device based on a current position of a write pointer within the memory zone. The file system data comprises data files contained within a file system and file structure metadata describing a file structure of the file system. The processing device detects a write event based on the write pointer advancing past a predetermined memory address within the memory zone that corresponds to a checkpoint. The checkpoint is a second area within the memory zone that is designated for storing write event data. Based on detecting the write event, the processing device writes write event data to the checkpoint, the first write event data indicating a most recent memory address of a root node of the file structure within the memory zone.

20 Claims, 6 Drawing Sheets

(51) Int. Cl.

| | | |
|---|---|---|
| *G06F 12/02* | (2006.01) | |
| *G06F 16/16* | (2019.01) | |
| *G06F 16/17* | (2019.01) | |
| *G06F 16/18* | (2019.01) | |

(52) U.S. Cl.
CPC ........ *G06F 12/0246* (2013.01); *G06F 16/164* (2019.01); *G06F 16/1873* (2019.01)

(58) Field of Classification Search
CPC ........ G06F 9/06; G06F 16/178; G06F 16/162; G06F 16/164; G06F 16/16; G06F 16/183; G11B 3/00; G11B 5/00; G11B 7/00; G11B 9/00; G11B 11/00; G11B 13/00; G11B 15/00; G11B 17/00; G11B 19/00; G06Q 10/10; G06Q 20/20; G06Q 20/209
See application file for complete search history.

(56) References Cited

U.S. PATENT DOCUMENTS

| | | | | |
|---|---|---|---|---|
| 10,417,190 | B1 * | 9/2019 | Donlan | ................ G06F 16/128 |
| 2002/0181376 | A1 | 12/2002 | Acker | |
| 2011/0252099 | A1 | 10/2011 | Pattekar et al. | |
| 2013/0103644 | A1 | 4/2013 | Shoens | |
| 2017/0277484 | A1 | 9/2017 | Takagi | |
| 2022/0066992 | A1 * | 3/2022 | Duval | ................ G06F 12/0246 |

OTHER PUBLICATIONS

U.S. Appl. No. 17/005,671, Response filed Sep. 13, 2022 to Restriction Requirement mailed Jul. 15, 2022, 9 pgs.
U.S. Appl. No. 17/005,671, Non Final Office Action mailed Nov. 18, 2022, 10 pgs.
U.S. Appl. No. 17/005,671, Response filed Feb. 15, 2023 to Non Final Office Action mailed Nov. 18, 2022, 10 pgs.
U.S. Appl. No. 17/005,671, Non Final Office Action mailed Jun. 6, 2023, 12 pgs.
U.S. Appl. No. 17/005,671, Response filed Sep. 6, 2023 to Non Final Office Action mailed Jun. 6, 2023, 11 pgs.
U.S. Appl. No. 17/005,671, Final Office Action mailed Dec. 7, 2023, 10 pgs.
U.S. Appl. No. 17/005,671, Response filed Jan. 31, 2024 to Final Office Action mailed Dec. 7, 2023, 11 pgs.
U.S. Appl. No. 17/005,671, Advisory Action mailed Feb. 14, 2024, 3 pgs.
U.S. Appl. No. 17/005,671, Response filed Mar. 6, 2024 to Advisory Action mailed Feb. 14, 2024 and Final Office Action mailed Dec. 7, 2023, 12 pgs.
U.S. Appl. No. 17/005,671, Notice of Allowance mailed May 30, 2024, 5 pgs.

* cited by examiner

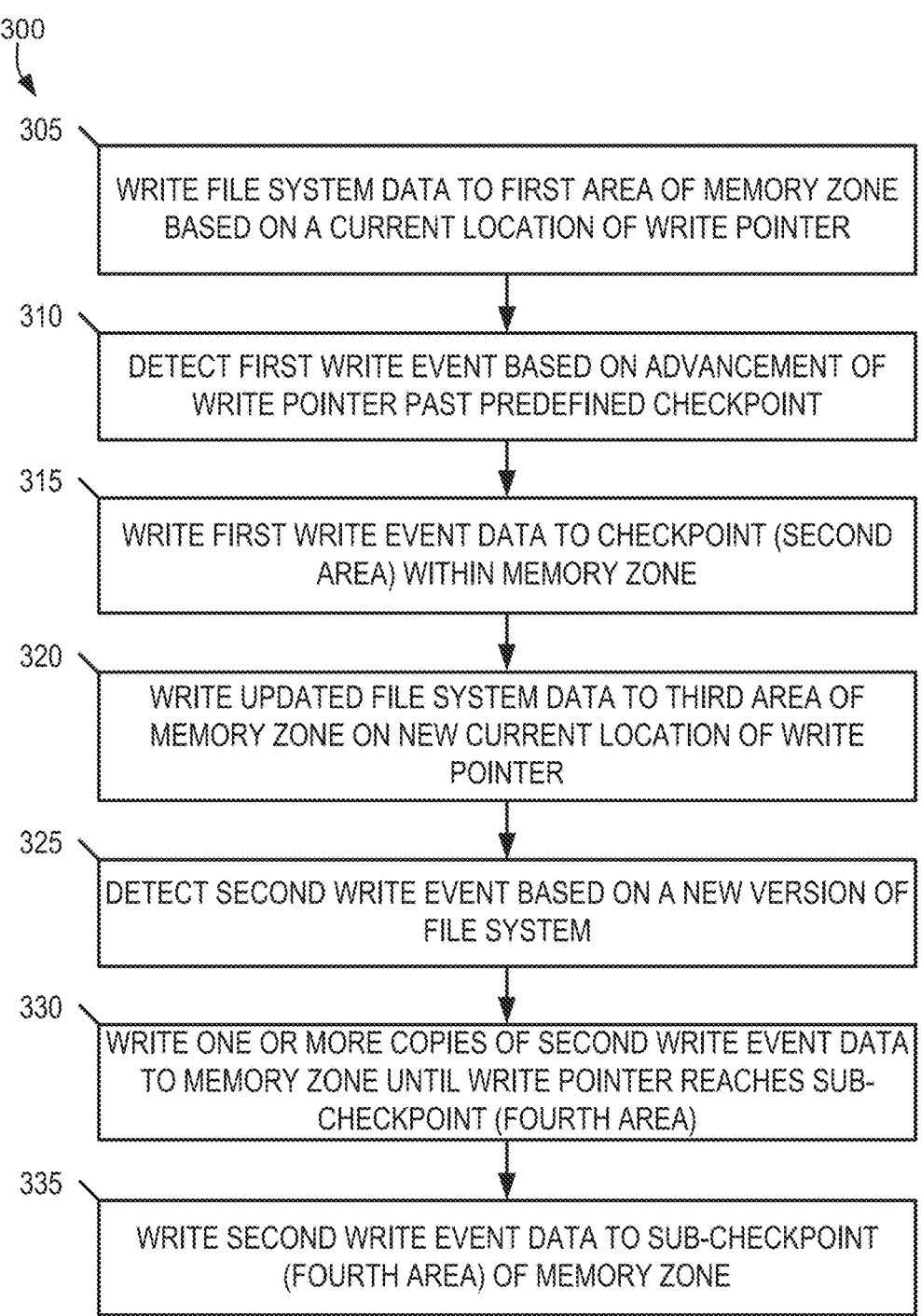

300

305

WRITE FILE SYSTEM DATA TO FIRST AREA OF MEMORY ZONE
BASED ON A CURRENT LOCATION OF WRITE POINTER

310

DETECT FIRST WRITE EVENT BASED ON ADVANCEMENT OF
WRITE POINTER PAST PREDEFINED CHECKPOINT

315

WRITE FIRST WRITE EVENT DATA TO CHECKPOINT (SECOND
AREA) WITHIN MEMORY ZONE

320

WRITE UPDATED FILE SYSTEM DATA TO THIRD AREA OF
MEMORY ZONE ON NEW CURRENT LOCATION OF WRITE
POINTER

325

DETECT SECOND WRITE EVENT BASED ON A NEW VERSION OF
FILE SYSTEM

330

WRITE ONE OR MORE COPIES OF SECOND WRITE EVENT DATA
TO MEMORY ZONE UNTIL WRITE POINTER REACHES SUB-
CHECKPOINT (FOURTH AREA)

335

WRITE SECOND WRITE EVENT DATA TO SUB-CHECKPOINT
(FOURTH AREA) OF MEMORY ZONE

*FIG. 3*

400

X

440
DETERMINE MEMORY ADDRESS OF LAST SUB-CHECKPOINT BEFORE CURRENT LOCATION OF WRITE POINTER

445
SET READ POINTER TO MEMORY ADDRESS OF LAST SUB-CHECKPOINT

450
READ DATA AT STORED AT CURRENT LOCATION OF READ POINTER

455
DATA = WRITE EVENT DATA?

NO

460
INCREMENT READ POINTER

CHECKPOINT PASSED?

NO

YES

STOP

YES

465
DETERMINE MEMORY ADDRESS OF ROOT NODE OF CURRENT VERSION OF TARGET FILE SYSTEM STRUCTURE

470
LOAD FILE SYSTEM TO VOLATILE MEMORY BASED ON MEMORY ADDRESS OF ROOT NODE OF CURRENT VERSION

*FIG. 5*

LOG-STRUCTURED FILE SYSTEM FOR A ZONED BLOCK MEMORY DEVICE

PRIORITY APPLICATION

This application is a Divisional of U.S. application Ser. No. 17/005,671, filed Aug. 28, 2020, which is incorporated herein by reference in its entirety.

TECHNICAL FIELD

Embodiments of the disclosure relate generally to memory sub-systems and, more specifically, to a log-structured file system for a zoned block memory device.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

FIG. 3 is a flow diagram illustrating an example method for writing data to a log-structured file system on a zone-block memory device, in accordance with some embodiments of the present disclosure.

FIGS. 4-5 is a flow diagram illustrating an example method for loading a log-structured file system from a zone-block memory device to a volatile memory device, in accordance with some embodiments of the present disclosure.

DETAILED DESCRIPTION

Figure 1:
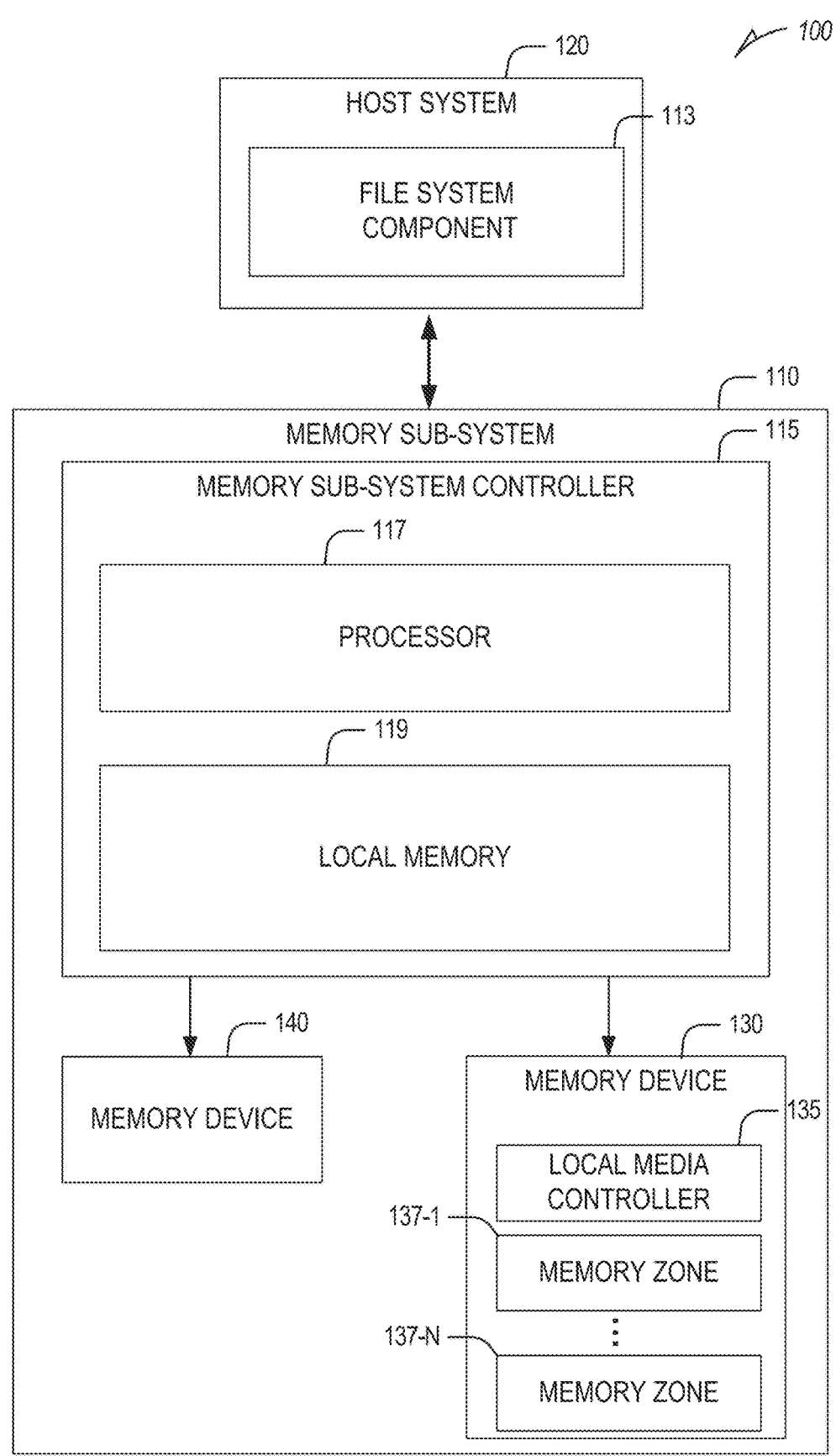
FIG. 1 illustrates an example computing system that includes a memory sub-system, in accordance with some embodiments of the present disclosure.

Aspects of the present disclosure are directed to a log-structured file system for a memory sub-system that includes a zone-blocked memory device. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. An example non-volatile memory device contains negative-and (NAND) cells. Other examples of non-volatile memory devices are described below in conjunction with FIG. 1. Data operations can be performed by the memory sub-system. The data operations can be host-initiated operations. For example, the host system can initiate a data operation (e.g., write, read, erase, etc.) on a memory sub-system. The host system can send access requests (e.g., write command, read command) to the memory sub-system, such as to store data on a memory device at the memory sub-system and to read data from the memory device on the memory sub-system.

A file system includes data written by an operating system of a host system as well as applications running on the operating system. A file system also includes metadata that may include hierarchical structure of folders into which data files are grouped. The hierarchical structure of folders in the file system can be represented by a tree with a single root node. When a change occurs in the file structure, a new file structure is created with a new root node. To load a file structure from a non-volatile memory device to a volatile memory device, the root node must first be loaded. The root node includes memory addresses of each of its nodes, so once the file system knows the root node of the file structure, the file system can readily obtain the rest of the tree.

A log-structured file system is an example type of file system in which all modifications are sequentially written to a memory device in a log-like structure, thereby simplifying crash recovery and maintaining multiple time snapshots of a file system. The log is the only structure on the memory device, and it contains indexing information so that files can be read back from the memory device efficiently. In order to maintain large free areas on the memory device for fast writing, the memory space is divided into segments and a garbage collector process collects the valid data from heavily fragmented segments.

Log-structured file systems and copy-on-write file systems such as Flash-Friendly File System (F2FS) and b-tree file system (Btrfs) require a small portion of write in-place modifications, meaning that data at a fixed address in the memory device needs to be edited to support any change to the file system. Certain memory devices, such as zoned-block memory devices, do not support in-place modifications. A zoned-block memory device includes multiple memory zones, and each memory zone includes two dynamically changing areas: a filled storage area and a future storage area. In an initial state, an entire zone includes only a future storage area. As write commands are issued to the zoned block memory device, data is incrementally written to the future storage area at a memory address within the future storage area based on a location of the device's write pointer. That is, data is written to the next available memory address after the position of the write pointer, and as data is written to the memory zone, the write pointer advances to the next memory address in the address space.

As noted above, zoned-block memory devices do not support in-place modification. This means that the host system cannot specify the memory address to which data is to be written nor can the host system modify data stored in the filled storage area without erasing the entire memory zone. Given that zoned-block memory devices do not allow any in-place writing, zoned-blocked memory devices do not natively support file system such as F2FS and Btrfs that require some in-place modifications.

Aspects of the present disclosure address the above and other issues by using a predefined write pattern for zoned block memory devices to support log-structured file systems along with other file systems that may require in-place writes. To support file systems that require support for some write-in-place, a file system component operating a host system uses the predefined write pattern for updates to the memory address of a file system's root node along with knowledge of a current position of the zone-block memory device's write pointer to enable the file system component to quickly retrieve the most recently written version of the file system.

In employing this write pattern, the file system component writes event data to predefined write pattern areas within each memory zone. The predefined write pattern areas include "checkpoints" and "sub-checkpoints" (also referred to herein as "checkpoint areas" and "sub-checkpoint areas," respectively). The write event data identifies the memory address of the root node of the current version of the file system and a validation header that is generated by the file system component by applying a mathematical function (e.g., a hash function) to a base address of a checkpoint and a predefined number known to the file system component. The processing device writes write event data for each detected write event.

As an example, file system data that includes data files contained with a file system as well as file structure metadata that describes a hierarchical tree structure of the file system is written to the device at a location based on a position of the memory device's write pointer. As the data is written to the device, the write pointer advances to a new position. The file system component can detect a write event based on the write point of the memory device advancing past a predefined memory address corresponding to a checkpoint; write event data is written to the checkpoint based thereon.

The processing device also detects a write event when a change is made to the file system thereby changing the address of the root node of the file system. For example, if any change occurs in the file system, the file structure is updated, and when a file system synchronization command is issued by the host system, a new version of the file structure is written to the zoned block memory device. The memory address of the root node of the most recent version of the file system is therefore changed. It is important for the file system to be able to retrieve the latest memory address of the root node in memory to be able to maintain the file system in its most recent state, especially at boot time. Accordingly, when a change to the file system occurs, the processing device writes event data to the next sub-checkpoint in the memory zone. Thus, while the processing device fills write event data into each checkpoint, write event data is written to sub-checkpoints only after a change to the file system's root node memory address has occurred.

To retrieve the memory address of the most recent version of the file system, the processing device reads write event data from the predefined write pattern areas. Because writes from multiple applications are supported, the processing device can verify the write event data validation header to confirm it contains address of a target file system's root node and not content written by another application.

Utilization of the predefined write pattern set forth herein increases the portability and functionality of zone-block memory devices as they do not natively support file systems that require in-place writes. This in turn allows zoned block memory devices to be used in many more implementations than would otherwise be possible with low integration effort and costs. Moreover, many applications other than the file system can store data on the zoned block memory device even without knowledge of the checkpoints and sub-checkpoints and can write in these areas with impunity. The predefined write pattern is robust against interfaces between applications by defining the write pattern areas that are large enough to allow writes by other applications, as long as at least one page can be used for writing the file system's root node memory address. As noted above, write event data that includes the root node address also includes a header with a signature that distinguishes it from writes by any other application.

In addition, the write pattern disclosed herein may be beneficial in that the write overhead of writing the memory address of the root node of the file system is minimized to avoid wasting precious storage space in the zone-block storage device. For example, though the file system component writes the write event data to each checkpoint, the file system component only writes to sub-checkpoints when a change to the memory address of the root node of the file system occurs.

To avoid delays, especially at boot time, the time required for the file system to retrieve the last written root node address is also minimized by limiting the search to a limited number of areas on the zoned block memory device. At worst, the search includes the last checkpoint before the write pointer and every sub-checkpoint between that checkpoint and the current position of the write pointer.

FIG. 1 illustrates an example computing environment 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a SSD, a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM). The computing environment 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, and so forth.

The host system 120 can be a computing device such as a desktop computer, laptop computer, network server, mobile device, or such computing device that includes a memory and a processing device. The host system 120 can be coupled to the memory sub-system 110 via a physical host interface. Examples of a physical host interface include, but are not limited to, a serial advanced technology attachment (SATA) interface, a peripheral component interconnect express (PCIe) interface, USB interface, Fibre Channel, Serial Attached SCSI (SAS), and so forth. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

An example of non-volatile memory devices (e.g., memory device 130) includes a NAND type flash memory. Each of the memory devices 130 can include one or more arrays of memory cells such as single level cells (SLCs), multi-level cells (MLCs) (e.g., triple level cells (TLCs), or quad-level cells (QLCs)). In some embodiments, a particular memory component can include an SLC portion, and an MLC portion, a TLC portion, or a QLC portion of memory cells. Each of the memory cells can store one or more bits of data used by the host system 120. Furthermore, the memory cells of the memory devices 130 can be grouped as memory pages or memory blocks that can refer to a unit of the memory component used to store data.

One or more of the memory devices 130 can be a zone-block memory device that includes multiple memory zones. For example, as shown in FIG. 1, the memory device 130 includes memory zones 137-1 to 137-N.

The memory sub-system controller 115 can communicate with the memory devices 130 and 140 to perform operations such as reading data, writing data, or erasing data at the memory devices 130 and 140 and other such operations. The memory sub-system controller 115 can include hardware such as one or more integrated circuits and/or discrete components, a buffer memory, or a combination thereof. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and the like. The local memory 119 can also include ROM for storing micro-code. While the example memory sub-system 110 in FIG. 1 has been illustrated as including the memory sub-system controller 115, in another embodiment of the present disclosure, a memory sub-system 110 may not include a memory sub-system controller 115, and may instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address and a physical block address that are associated with the memory devices 130. The memory sub-system controller 115 can further include host interface circuitry to communicate with the host system 120 via the physical host interface. The host interface circuitry can convert the commands received from the host system into command instructions to access the memory devices 130 and convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controller 135 that operate in conjunction with memory sub-system controller 115 to execute operations on one or more memory cells of the memory devices 130.

As shown, the host system 120 includes a file system component 113 that is responsible for maintaining file systems stored on the memory devices 130 and 140. For example, the file system component 113 uses a predefined write pattern for the memory device 130 to support in-place write file systems. The predefined write pattern includes designating certain areas within the memory zones 137-1 to 137-N as checkpoints and sub-checkpoints. Checkpoints and sub-checkpoints are predefined areas within each of the memory zones 137-1 to 137-N that are designated for storing write event data. Write event data identifies a memory address of a root node of a past or current version of a file system and includes a validation header used to distinguish the write event data from data written by other applications. The processing device writes the write event data to each checkpoint, but only writes write event data to sub-checkpoints in response to changes to the memory address of the root node of the file system (e.g., when a change to the files system is made). The file system component 113 uses knowledge of the write pattern along the current position of the write pointer of the memory device 130 to retrieve the memory address of the root node of the most recent version of the file system and uses this information to load the most recent version of the file system at the host system 120.

In some embodiments, the memory sub-system controller 115 includes at least a portion of the file system component 113. For example, the memory sub-system controller 115 can include a processor 117 (processing device) configured to execute instructions stored in local memory 119 for performing the operations described herein. In some embodiments, the file system component 113 is part of the host system 120, an application, or an operating system. In some embodiments, the local media controller 135 includes at least a portion of the file system component 113.

Figures 2A, 2B:
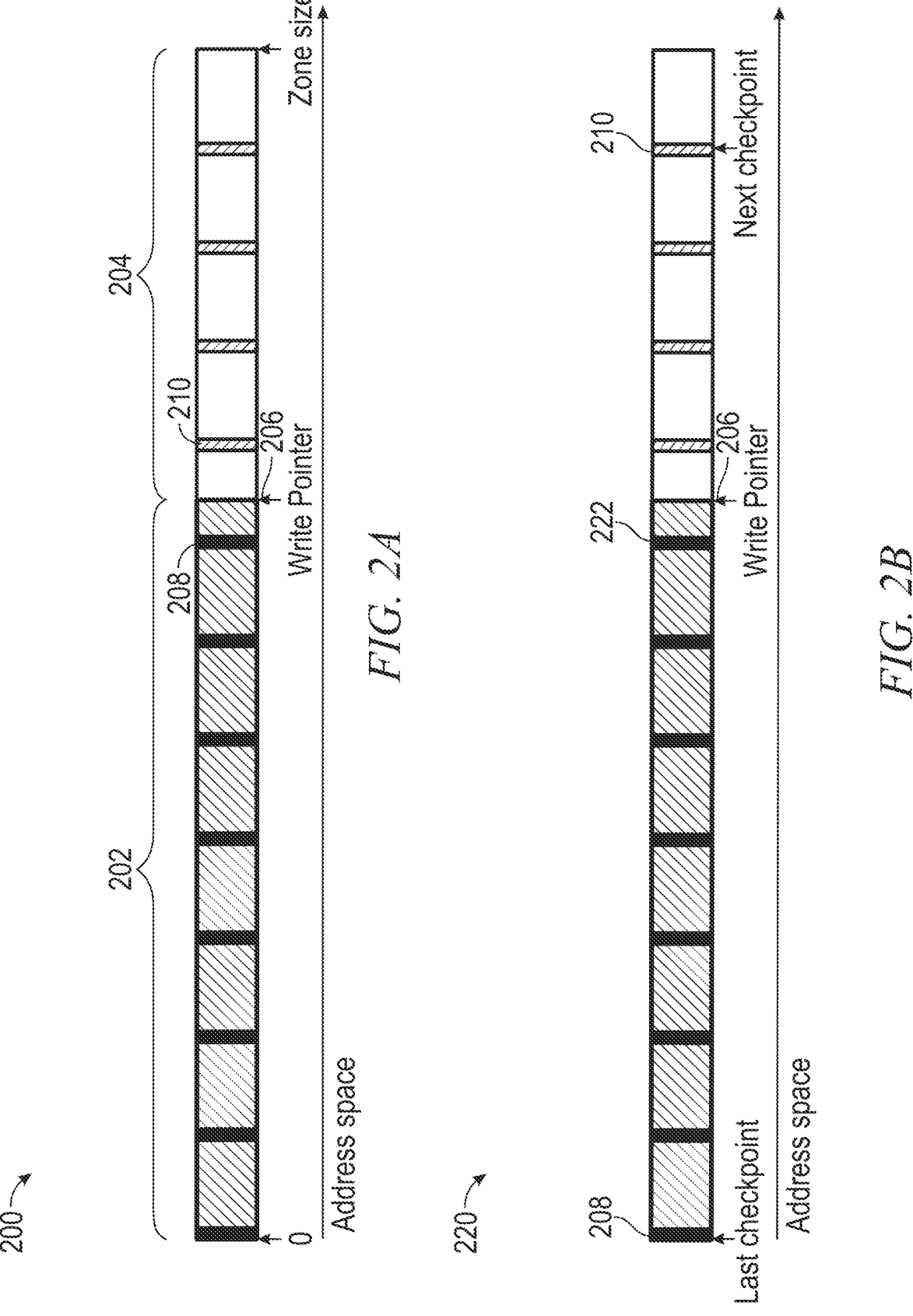
FIGS. 2A and 2B illustrate a write pattern of a log-structured file system implemented on a zone-blocked memory device, in accordance with some embodiments of the present disclosure.

FIGS. 2A and 2B illustrate a write pattern to support a log-structured file system on a zoned block memory device, in accordance with some embodiments of the present disclosure. A memory zone 200 of a zoned block memory device is shown. The memory zone 200 is an example instance of one of the memory zones 137-1 to 137-N of memory device 130. The memory zone 200 comprises a filled storage area 202 and a future storage area 204.

File system data describing a file system is written to the future storage area 204 at a location based on a current position of write pointer 206. More specifically, the file system data is written to the next available memory address in the future storage area 204 after the position of the write pointer 206. The file system data includes data files contained within the file system as well as file structure metadata that describes the file structure of the file system. As the data is written to the memory zone 200, the write pointer 206 advances to a new position.

The memory zone 200 also includes multiple checkpoint areas including filled checkpoint areas and future checkpoint areas. As an example, the memory zone includes filled checkpoint area 208 and future checkpoint area 210. A base memory address for each checkpoint area as well as a size of the checkpoint area is predefined and can be stored by the zoned block memory device. For example, the file system data can specify the base memory address of each checkpoint area as well as the size of checkpoint areas. Each checkpoint area is designated for storing write event data. The write event data specifies a memory address of a root node of the file system. The file system component 113 writes event data to each checkpoint area based on detecting the write pointer 206 advancing past the corresponding base memory address of the checkpoint.

With reference to FIG. 2B, a breakout view 220 of a portion of the memory zone 200 is illustrated. In particular, the breakout view 220 illustrates the portion of the memory zone 200 between the filled checkpoint area 208 and future checkpoint area 210. As shown, multiple sub-checkpoint areas are included between the filled checkpoint area 208 and the future checkpoint area 210. The sub-checkpoint areas include filled sub-checkpoint areas and future sub-checkpoint areas. Like the checkpoint areas, the sub-checkpoint areas are predefined regions within the memory zone 200 that are designated for storing write event data; the base address of each sub-checkpoint as well as the size of sub-checkpoint areas is predefined and stored by the device. However, unlike checkpoint areas, write event data is only written to sub-checkpoint areas when a change to the file system occurs. That is, the file system component 113 only writes the write event data to a sub-checkpoint if there has been a change to the memory address of the root node of the file system, which occurs when a new version of the file system is written to the memory zone 200 based on a change to the file system. To move the write pointer 206 to the next available sub-checkpoint area, the file system component 113 writes multiple copies of the write event data to the memory zone 200 until the write pointer 206 reaches the base address of the sub-checkpoint, after which the file system component 113 writes the write event data one last time.

To load the most recent version of the file system (e.g., at boot time), the file system component 113 identifies and retrieves the most recent write event data, which specifies the memory address of the root node of the most recent version of the file system. To retrieve the most recent write event data, the file system component 113 identifies the memory address corresponding to the current position of the write pointer 206. The file system component 113 can query the memory device 130 to determine the memory address corresponding to the current position of the write pointer 206. The file system component 113 identifies the base memory address of the last checkpoint before the write pointer 206, which in this example is the checkpoint area 208. The file system component 113 sets a position of a read pointer to this address and reads the data stored at that location to determine whether the data is write event data. The file system component 113 determines whether the data is write event data by performing a mathematical operation (e.g., a hash operation) on the validation header. If the data is not write event data, the processing device increments the read pointer until the write event data is found or until the current position of the write pointer 206 is reached. If the current position of the write pointer 206 is reached, an error has occurred and the file system component 113 repeats the operations described above.

Though the file system component 113 can find write event data in this manner, the write event data may not necessarily correspond to the most recent version of the file system. That is, the write event data may correspond to a previous version of the file system and may specify a memory address of the root node of the previous version of the file structure. To ensure that the most recent write event data is retrieved, the file system component 113 identifies the location of the last sub-checkpoint before the current position of the write pointer 206, which in this example is sub-checkpoint area 222. The file system component 113 sets the read pointer to the base address of the sub-checkpoint and reads the data from that location. The file system component 113 determines whether the read data is the most recent event data by performing the mathematical operation on the validation header. If the data read by the file system component 113 is not write event data, the file system component 113 increments the read pointer and reads the corresponding data until the most recent write event data is found or until the read pointer is incremented beyond the predefined size of the sub-checkpoint area 222. If the read pointer is incremented beyond the predefined size of the sub-checkpoint area 222, the file system component 113 identifies the sub-checkpoint area before the sub-checkpoint area 222, and the process described above is repeated.

Once the file system component 113 finds the most recent write event data, the file system component 113 determines the memory address of the root node of the most recent version of the file system, and uses this information to the identify the full file structure and load the entire the file system into volatile memory.

FIG. 3 is a flow diagram illustrating an example method 300 for writing data to a log-structured file system on a zoned-block memory device, in accordance with some embodiments of the present disclosure. The method 300 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 300 is performed by the file system component 113 of FIG. 1. Although processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 305, the processing device (e.g., processor 117) writes file system data to a first area of a memory zone of the zoned block memory device based on a current location of a write pointer within the memory zone. As noted above, each memory zone of the zoned block memory device includes a filled storage area and a future storage area. The processing device can write the file system data to the future storage area at the next available memory address after the current position of the write pointer. The file system data includes data files contained within a file system and file structure metadata describing at least a portion of a file structure. The writing of the file system data to the zoned block memory device causes the write pointer to advance to another position (the next available memory address within the future storage area of the memory zone).

As shown at operation 310, the processing device detects a first write event based on advancement of the write pointer past a predefined checkpoint within the memory zone. The processing device determines that the write point has advanced past a predefined checkpoint based on the write pointer advancing past a memory address in the memory zone that is predefined as a base address for the checkpoint. A checkpoint is a designated area within the memory zone for storing write event data.

The processing device writes first write event data to the checkpoint within the memory zone (see operation 315). That is, the processing device writes the first write event data to a second area within the memory zone. The first write event data comprises a header and the most recent memory address of a root node of the file structure. In some instances, the first write event data can further include a previous memory address of the root node. The header comprises a result of applying a mathematical function (e.g., a hashing function) to the base memory address of the checkpoint and a constant number. Accordingly, the processing device generates the header by applying the mathematical function to the base memory address of the checkpoint and the constant number.

Responsive to a change to file system data, the processing device writes updated file system data to a third area of the memory zone based on a new current position of the write pointer, at operation 320. The updated file system data includes updated file structure metadata describing a new version of the file system.

At operation 325, the processing device detects a second write event based on the new version of the file system. Based on detecting the second write event, the processing device, at operation 330, writes one or more copies of second write event data to the memory zone until the write pointer reaches a predefined memory address of a sub-checkpoint. The sub-checkpoint is a fourth area within the memory zone that is designated for storing write event data. The second write event data comprises a most recent memory address of a root node of the new version of the file structure. At operation 335, the processing device writes the second write event data to the sub-checkpoint (a fourth area) of the memory zone.

Figure 4:
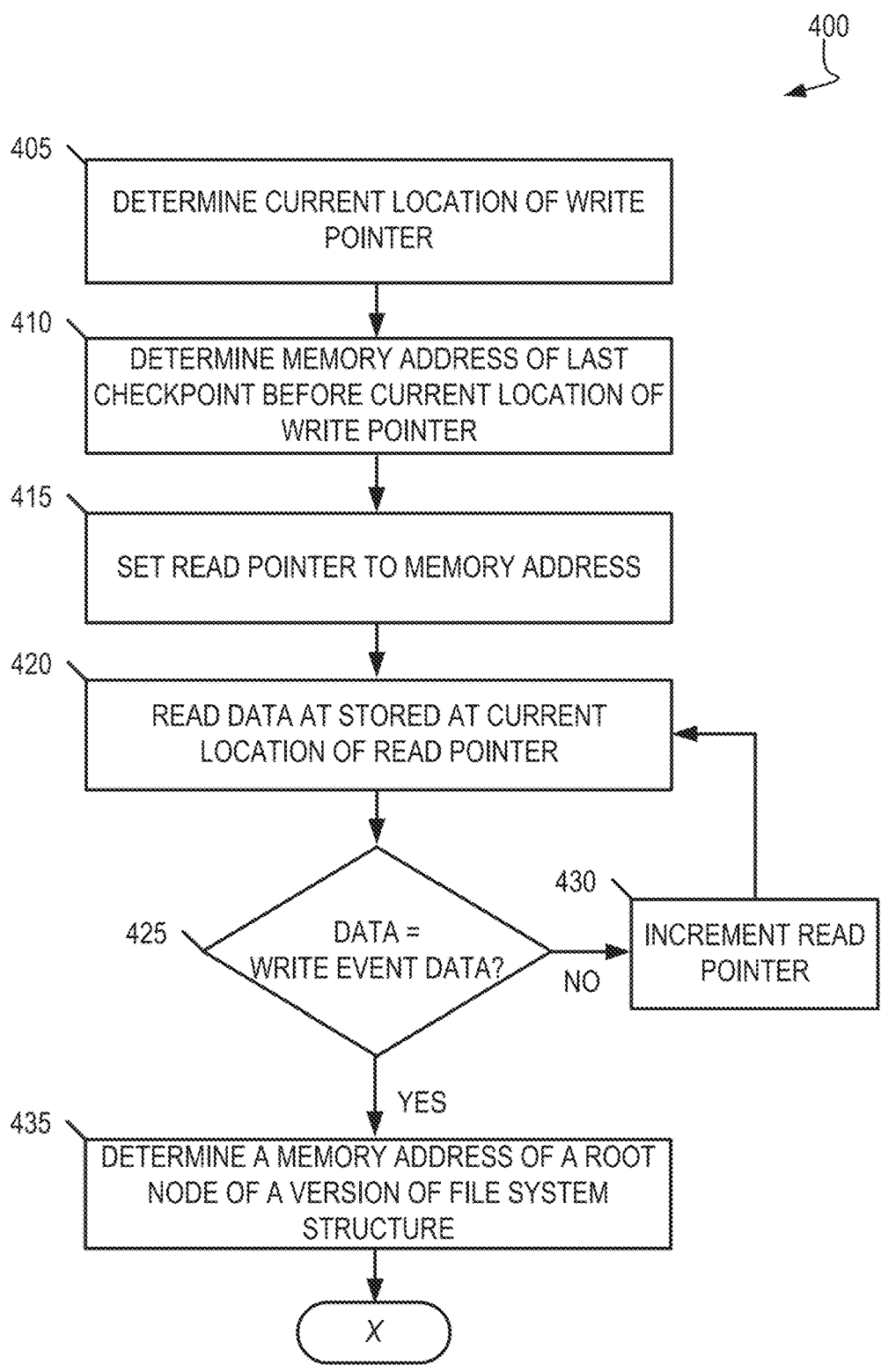

FIGS. 4-5 show a flow diagram illustrating an example method 400 for loading a log-structured file system from a zoned block memory device to a volatile memory device, in accordance with some embodiments of the present disclosure. The method 400 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 400 is performed by the file system component 113 of FIG. 1. Although processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the processing device determines a current position of the write pointer within a memory zone of a zoned block memory device. That is, the processing device determines a first memory address corresponding to the current position of the write pointer. The processing device can determine the memory address corresponding to the current position of the write pointer by querying the memory device.

As shown a operation 410, the processing device determines a second memory address corresponding to the last checkpoint before the current position of the write pointer. As noted above, base memory addresses of checkpoint areas and sub-checkpoint areas within a memory zone are predefined. File system data that includes the predetermined mapping between the memory addresses and checkpoints and the sub-check points is stored by the memory device and can be referenced by the processing device in determining the memory address of the last checkpoint before the current location of the write point.

The processing device, at operation 415, sets a read pointer to the second memory address corresponding to the last checkpoint before the current position of the write pointer. The read pointer controls the location from which data is read from the memory zone. Accordingly, at operation 420, the processing device reads data stored at the current position of the read pointer. For example, in a first iteration of the operation 420, the processing device reads data stored at the second memory address.

As shown at operation 425, the processing device determines whether the data stored at the current position of the read pointer is updated write event data associated with a target file system (e.g., write event data written after the data written to the checkpoint). The processing device determines whether the data is updated write event data by applying a mathematical function (e.g., a hash function) to the data using a constant number associated with the target file system. For example, as noted above, write event data includes a memory address corresponding to a root node of a file system and a header that is generated by applying a mathematical function to the base memory address of the checkpoint and a constant number that is specifically associated with the target file system. Thus, in determining whether the data is write event data, the processing device applies an inverse mathematical function to the header to determine whether it includes the base memory address of the checkpoint and the constant number that is specifically associated with the target file system.

If the processing device determines that the data stored at the current position of the read pointer does not include write event data associated with the target file system (e.g., the data is data written by another application), the processing device increments the read pointer at operation 430 and the method 400 returns to operation 420 where the processing device reads data at the new position of the read pointer and determines whether that data is updated write event data associated with the target file system.

If the processing device determines that the data stored at the current position of the read pointer is updated write event data associated with the target file system, the processing device determines a third memory address corresponding to a root node of a version of the target file structure, at operation 435. The third memory address can correspond to a root node of a current or a previous version of the target file structure. To ensure that the processing device determines the memory address of the current version of the target file structure, the processing device can perform the operations that follow.

At operation 440, the processing device determines a fourth memory address corresponding to a last sub-checkpoint before the current position of the write pointer. Like checkpoints, locations of sub-checkpoint areas within the memory zone are predefined, and data describing the locations (memory addresses) of sub-checkpoints can be stored by the memory device and referenced by the processing device to determine the memory address of the last sub-checkpoint before the current position of the write pointer.

The processing device, at operation 445, sets the read pointer to the fourth memory address corresponding to the last sub-checkpoint before the current position of the write pointer. The processing device reads data stored at the current position of the read pointer (e.g., the fourth memory address in the first iteration of operation 445), at operation 450, and the processing device determines whether the data stored at the current position of the read pointer includes write event data, at operation 455. If the processing device determines that the data does not include write event data, the processing device increments the read pointer at operation 460 and the method 400 returns to operation 450. If the read pointer reaches the end of the window size for the sub checkpoint, the processing device identifies the sub-checkpoint that immediately precedes the sub-checkpoint being analyzed, sets the read pointer to the memory address of that sub-checkpoint, and repeats the operations 450 and 455 until the write event data is found or until the window size is again reached. As shown, the read pointer will not move over any checkpoint, and the search for sub-checkpoints will stop if the preceding sub-checkpoint precedes a checkpoint.

If the processing device determines that the data stored at the current position of the read pointer includes write event data, the processing device determines a fifth memory address corresponding to a root node of the current version of the target file structure (at operation 465) based on the write event data.

At operation 470, the processing device loads the target file system from the zoned block memory device to a volatile memory device based on the fifth memory address corresponding to the root node of the current version of the target file structure. As noted above, the root node of the file structure indicates the locations of child nodes in the file structure, and thus, once the memory address of the root node is known, the processing device is able to load the entire tree structure.

EXAMPLES

Example 1 is a system comprising: a zoned block memory device comprising a memory zone; and a processing device, operatively coupled with the zoned block memory device, to perform operations comprising: writing file system data to a first area of the memory zone based on a current position of a write pointer within the memory zone, the file system data comprising data files contained within a file system and file system metadata describing a file structure of the file system; detecting a first write event based on the write pointer advancing past a predefined memory address within the memory zone that corresponds to a checkpoint, the checkpoint comprising a second area within the memory zone that is designated for storing write event data; and based on detecting the first write event, writing first write event data to the checkpoint, the first write event data indicating a most recent memory address of a root node of the file structure within the memory zone.

In Example 2, the operations of Example 1, further comprise: writing updated file system metadata to the zoned block memory device at a third area within the memory zone, the updated file system data comprising updated file system metadata describing a new version of the file structure; detecting a second write event based on the new version of the file structure; and based on detecting the second write event, writing second write event data to a sub-checkpoint in the memory zone, the sub-checkpoint comprising a fourth area within the memory zone that is designated for storing write event data, the second write event data indicating a most recent memory address of a root node of the new version of the file structure.

In Example 3, the operations of any one or more of Examples 1 and 2 further comprise: prior to writing the second write event data to the fourth area, writing copies of the second write event data to the memory zone until the write pointer reaches the fourth area of the memory zone.

In Example 4, the operations of any one or more of Examples 1-3 further comprise: determining the checkpoint is the last checkpoint within the memory zone before the current position of the write pointer; reading the first write event data stored at the checkpoint; and determining a memory address of the root node of a previous version of the file structure within the memory zone based on the first write event data.

In Example 5, the operations of any one or more of Examples 1~4 further comprise: determining the sub-checkpoint is the last checkpoint within the memory zone before the current position of the write pointer; reading the second write event data stored at the sub-checkpoint; and determining the most recent memory address of the root node of the new version of the file structure within the memory zone based on the second write event data.

In Example 6, the operations of any one or more of Examples 1-5, wherein the operations further comprise: loading a most recent version of the file system to a volatile memory device based on the most recent memory address of the root node of the new version of the file structure.

In Example 7, the first write event data of any one or more of Examples 1-5 comprises: the most recent memory address of the root node of the file structure; and a header comprising a result of a mathematical function applied to the predefined memory address corresponding to the checkpoint and a constant number.

Example 8 is a non-transitory computer-readable storage medium comprising instructions that, when executed by a processing device, configure the processing device to perform operations comprising: determining a current position of a write pointer within a memory zone of a zoned block memory device; identifying a checkpoint within the memory zone before the current position of the write pointer, the checkpoint comprising an area within the memory zone that is designated for storing write event data of a target file system; reading data stored at the checkpoint; determining whether the data stored at the checkpoint corresponds to the write event data of the target file system; and determining a memory address of a root node of a version of a file structure of the target file system based on the write event data.

Example 9 includes the subject matter of Example 8, wherein: the memory address is a first memory address; the area designated for storing the write event data is a first area; the version of the file structure is a previous version of the file structure; and the operations further comprise: identifying a sub-checkpoint within the memory zone before the current position of the write pointer, the sub-checkpoint comprising a second area designated for storing write event data of the target file system; reading data stored at the sub-checkpoint; determining whether the data stored at the sub-checkpoint corresponds to updated write event data of the target file system; determining a second memory address corresponding to a root node of a current version of the target file structure based on the updated write event data; and loading the target file system on a volatile memory device based on the second memory address corresponding to the root node of the current version of the target file structure.

Example 10 includes the subject matter of any one or more of Examples 8 and 9 wherein: the memory address is a first memory address; and the write event data comprises: the first memory address; and a header comprising a result of a mathematical function applied to a second memory address and a constant number, the second memory address corresponding to the checkpoint.

Example 11 includes the subject matter of any one or more of Examples 8-10 wherein determining whether the data stored at the checkpoint corresponds to the write event data of the target file system comprises: applying the mathematical function to the header.

Example 12 includes the subject matter of any one or more of Examples 8-11 wherein the identifying the checkpoint comprises identifying a predefined memory address within the memory zone that corresponds to the checkpoint.

Example 13 includes the subject matter of any one or more of Examples 8-12 wherein the operations further comprise: setting a read pointer to the predefined memory address; determining that data stored at the predefined memory address does not include the write event data of the target file system; based on determining that data stored at the predefined memory address does not include the write event data of the target file system, incrementing the read pointer; and determining whether the write event data of the target file structure is stored at a current position of the read pointer.

Example 14 is a method comprising: writing, by a processing device, file system data to a first area of a memory zone of a zoned block memory device based on a current position of a write pointer within the memory zone, the file system data comprising data files contained within a file system and file structure metadata describing a file structure of the file system; detecting, by the processing device, a first write event based on the write pointer advancing past a predefined memory address within the memory zone that corresponds to a checkpoint, the checkpoint comprising a second area within the memory zone that is designated for storing write event data; and based on detecting the first write event, writing, by the processing device, first write event data to the checkpoint, the first write event data indicating a most recent memory address of a root node of the file structure within the memory zone.

In Example 15, the method of Example 14 further comprises: writing updated file system data to the zoned block memory device at a third area within the memory zone, the updated file system data comprising updated file structure metadata describing a new version of the file structure; detecting a second write event based on the new version of the file structure; and based on detecting the second write event, writing second write event data to a sub-checkpoint in the memory zone, the sub-checkpoint comprising a fourth area within the memory zone that is designated for storing write event data, the second write event data indicating a most recent memory address of a root node of the new version of the file structure.

In Example 16, the method of any one or more of Examples 14 and 15 further comprise: prior to writing the second write event data to the fourth area, writing one or more copies of the second write event data to the memory zone until the write pointer reaches the fourth area of the memory zone.

In Example 17, the method of any one or more of Examples 14-16 further comprises determining the checkpoint is the last checkpoint within the memory zone before the current position of the write pointer; reading the first write event data stored at the checkpoint; and determining a memory address of the root node of a previous version of the file structure within the memory zone based on the first write event data.

In Example 18, the method of any one or more of Examples 14-17 further comprises: determining the sub-checkpoint is the last checkpoint within the memory zone before the current position of the write pointer; reading the second write event data stored at the sub-checkpoint; and determining the most recent memory address of the root node of the new version of the file structure within the memory zone based on the second write event data.

In Example 19, the method of any one or more of Examples 14-18 further comprises: loading a most recent version of the file system to a volatile memory device based on the most recent memory address of the root node of the new version of the file structure.

In Example 20, the first write event data of any one or more of Examples 14-19 comprises: the most recent memory address of the root node of the file structure; and a header comprising a result of a mathematical function applied to the predefined memory address that corresponds to the checkpoint and a constant number.

Figure 6:
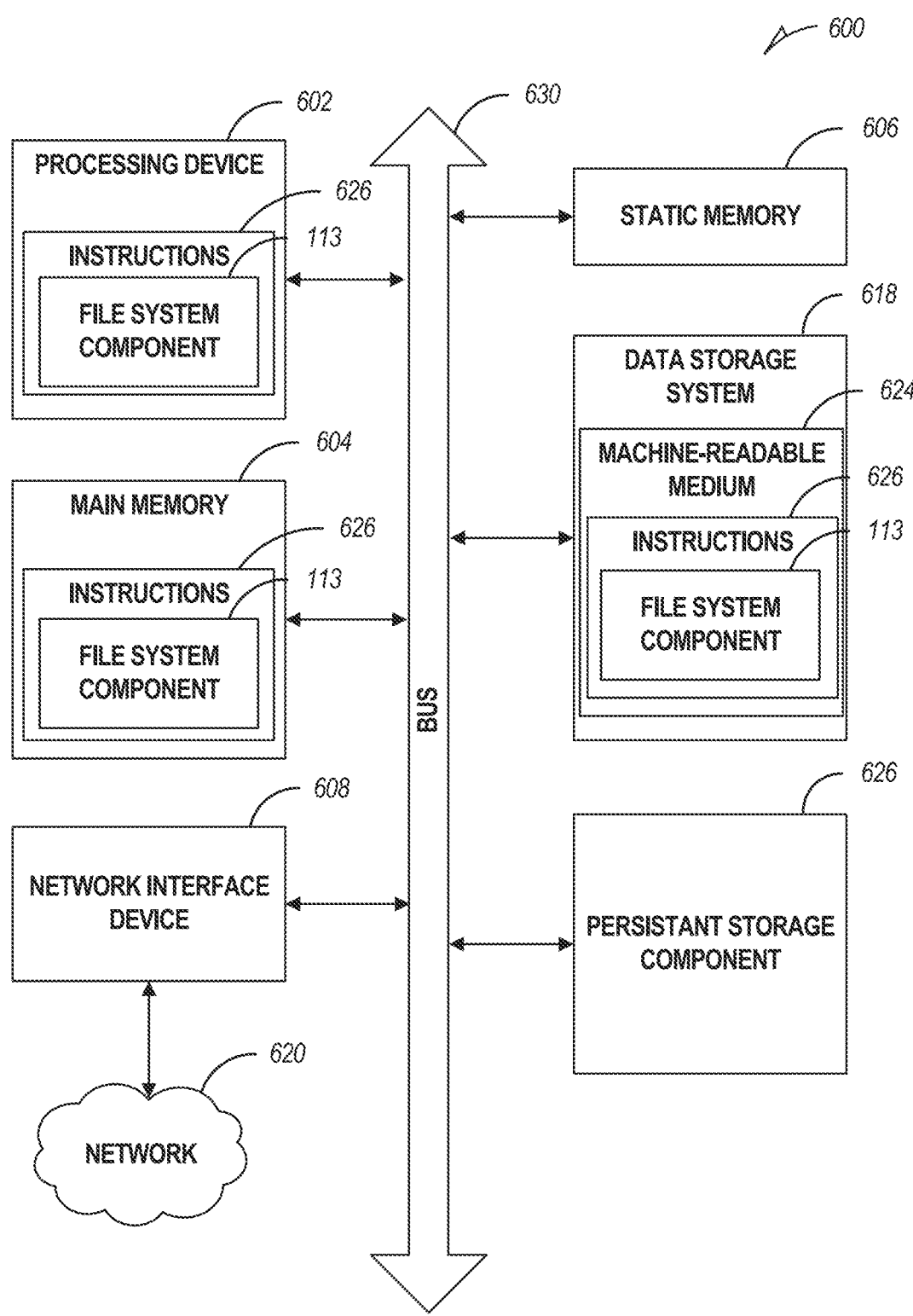
FIG. 6 is a block diagram of an example computer system in which embodiments of the present disclosure may operate.

FIG. 6 illustrates an example machine in the form of a computer system 600 within which a set of instructions can be executed for causing the machine to perform any one or more of the methodologies discussed herein. FIG. 6 illustrates an example machine of a computer system 600 within which a set of instructions can be executed for causing the machine to perform any one or more of the methodologies discussed herein. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the file system component 113 of FIG. 1). In alternative embodiments, the machine can be connected (e.g., networked) to other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., ROM, flash memory, DRAM such as SDRAM or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an ASIC, a FPGA, a digital signal processor (DSP), network processor, or the like. The processing device 602 is configured to execute instructions 626 for performing the operations and steps discussed herein. The computer system 600 can further include a network interface device 608 to communicate over a network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a file system component (e.g., the file system component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory components, etc.

In the foregoing specification, embodiments of the disclosure have been described with reference to specific example embodiments thereof. It will be evident that various modifications can be made thereto without departing from the broader scope of embodiments of the disclosure as set forth in the following claims. The specification and drawings are, accordingly, to be regarded in an illustrative sense rather than a restrictive sense.

What is claimed is:

1. A system comprising:
   a zoned block memory device comprising a memory zone; and
   a processing device, operatively coupled with the zoned block memory device, to perform operations comprising:
   determining a current position of a write pointer within the memory zone of the zoned block memory device;
   identifying a checkpoint within the memory zone before the current position of the write pointer, the checkpoint comprising first area within the memory zone that is designated for storing write event data of a target file system;

reading data stored at the checkpoint;

determining whether the data stored at the checkpoint corresponds to the write event data of the target file system;

determining a first memory address of a root node of a previous version of a file structure of the target file system based on the write event data;

identifying a sub-checkpoint within the memory zone before the current position of the write pointer, the sub-checkpoint comprising a second area designated for storing write event data of the target file system;

reading data stored at the sub-checkpoint;

determining whether the data stored at the sub-checkpoint corresponds to updated write event data of the target file system;

determining a second memory address corresponding to a root node of a current version of the target file structure based on the updated write event data; and loading the target file system on a volatile memory device based on the second memory address corresponding to the root node of the current version of the target file structure.

2. The system of claim 1, wherein:

the write event data comprises:

the first memory address; and a header comprising a result of a mathematical function applied to a second memory address and a constant number, the second memory address corresponding to the checkpoint.

3. The system of claim 2, wherein determining whether the data stored at the checkpoint corresponds to the write event data of the target file system comprises applying the mathematical function to the header.

4. The system of claim 3, wherein applying the mathematical function to the header comprises applying a hash function to the header.

5. The system of claim 1, wherein the identifying the checkpoint comprises identifying a predefined memory address within the memory zone that corresponds to the checkpoint.

6. The system of claim 5, wherein the operations further comprise setting a read pointer to the predefined memory address, wherein reading data stored at the checkpoint comprises reading data stored at a current position of the read pointer.

7. The system of claim 5, wherein the operations comprise:

setting a read pointer to the predefined memory address;

determining that data stored at the predefined memory address does not comprises the write event data of the target file system;

based on determining that data stored at the predefined memory address does not comprise the write event data of the target file system, incrementing the read pointer; and determining whether the write event data of the target file structure is stored at a current position of the read pointer.

8. A method comprising:

determining a current position of a write pointer within a memory zone of a zoned block memory device;

identifying a checkpoint within the memory zone before the current position of the write pointer, the checkpoint comprising a first area within the memory zone that is designated for storing write event data of a target file system;

reading data stored at the checkpoint;

determining whether the data stored at the checkpoint corresponds to the write event data of the target file system;

determining a first memory address of a root node of a previous version of a file structure of the target file system based on the write event data;

identifying a sub-checkpoint within the memory zone before the current position of the write pointer, the sub-checkpoint comprising a second area designated for storing write event data of the target file system;

reading data stored at the sub-checkpoint;

determining whether the data stored at the sub-checkpoint corresponds to updated write event data of the target file system;

determining a second memory address corresponding to a root node of a current version of the target file structure based on the updated write event data; and loading the target file system on a volatile memory device based on the second memory address corresponding to the root node of the current version of the target file structure.

9. The method of claim 8, wherein:

the write event data comprises:

the first memory address; and a header comprising a result of a mathematical function applied to a second memory address and a constant number, the second memory address corresponding to the checkpoint.

10. The method of claim 9, wherein determining whether the data stored at the checkpoint corresponds to the write event data of the target file system comprises applying the mathematical function to the header.

11. The method of claim 10, wherein applying the mathematical function to the header comprises applying a hash function to the header.

12. The method of claim 8, wherein the identifying the checkpoint comprises identifying a predefined memory address within the memory zone that corresponds to the checkpoint.

13. The method of claim 12, further comprising setting a read pointer to the predefined memory address, wherein reading data stored at the checkpoint comprises reading data stored at a current position of the read pointer.

14. The method of claim 12, comprising:

setting a read pointer to the predefined memory address;

determining that data stored at the predefined memory address does not comprise the write event data of the target file system;

based on determining that data stored at the predefined memory address does not comprise the write event data of the target file system, incrementing the read pointer; and determining whether the write event data of the target file structure is stored at a current position of the read pointer.

15. A non-transitory computer-readable storage medium comprising instructions that, when executed by a processing device, configure the processing device to perform operations comprising:

determining a current position of a write pointer within a memory zone of a zoned block memory device;

identifying a checkpoint within the memory zone before the current position of the write pointer, the checkpoint comprising first area within the memory zone that is designated for storing write event data of a target file system;

reading data stored at the checkpoint;

determining whether the data stored at the checkpoint corresponds to the write event data of the target file system;

determining a first memory address of a root node of a previous version of a file structure of the target file system based on the write event data;

identifying a sub-checkpoint within the memory zone before the current position of the write pointer, the sub-checkpoint comprising a second area designated for storing write event data of the target file system;

reading data stored at the sub-checkpoint;

determining whether the data stored at the sub-checkpoint corresponds to updated write event data of the target file system;

determining a second memory address corresponding to a root node of a current version of the target file structure based on the updated write event data; and loading the target file system on a volatile memory device based on the second memory address corresponding to the root node of the current version of the target file structure.

16. The non-transitory computer-readable storage medium of claim 15, wherein:

the write event data comprises:

the first memory address; and a header comprising a result of a mathematical function applied to a second memory address and a constant number, the second memory address corresponding to the checkpoint.

17. The non-transitory computer-readable storage medium of claim 16, wherein determining whether the data stored at the checkpoint corresponds to the write event data of the target file system comprises applying the mathematical function to the header.

18. The non-transitory computer-readable storage medium of claim 17, wherein applying the mathematical function to the header comprises applying a hash function to the header.

19. The non-transitory computer-readable storage medium of claim 15, wherein the identifying the checkpoint comprises identifying a predefined memory address within the memory zone that corresponds to the checkpoint.

20. The non-transitory computer-readable storage medium of claim 19, wherein the operations comprise:

setting a read pointer to the predefined memory address;

determining that data stored at the predefined memory address does not comprise the write event data of the target file system;

based on determining that data stored at the predefined memory address does not comprise the write event data of the target file system, incrementing the read pointer; and determining whether the write event data of the target file structure is stored at a current position of the read pointer.

* * * * *